Figure 1:
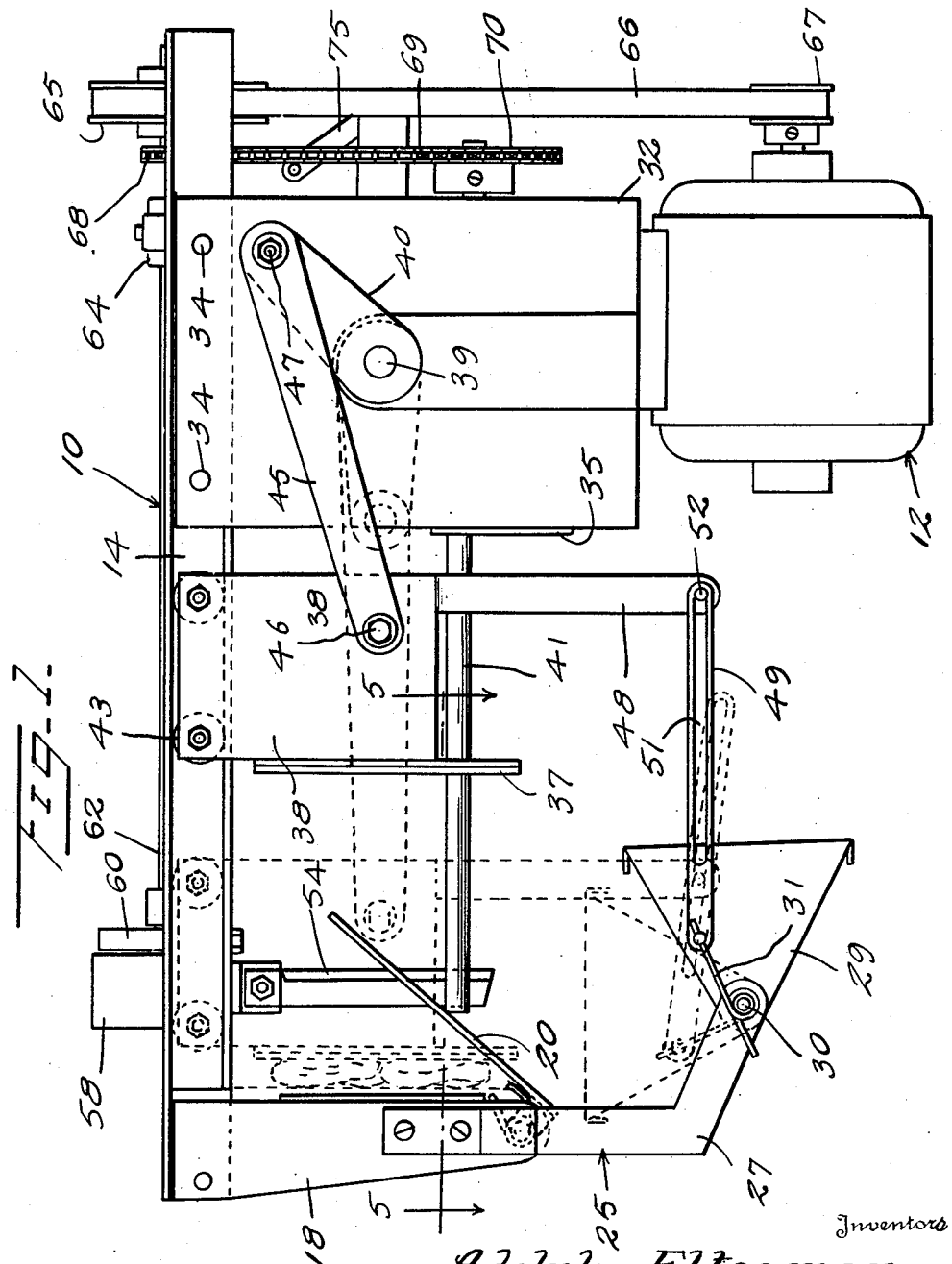

July 10, 1951 A. ELTERMAN ET AL 2,560,096
FRUIT JUICE MACHINE
Filed Sept 17, 1947 4 Sheets-Sheet 1

Inventors
Adolph Elterman
Hyman P. Peshkin
By Kimmel & Crowell
Attorneys

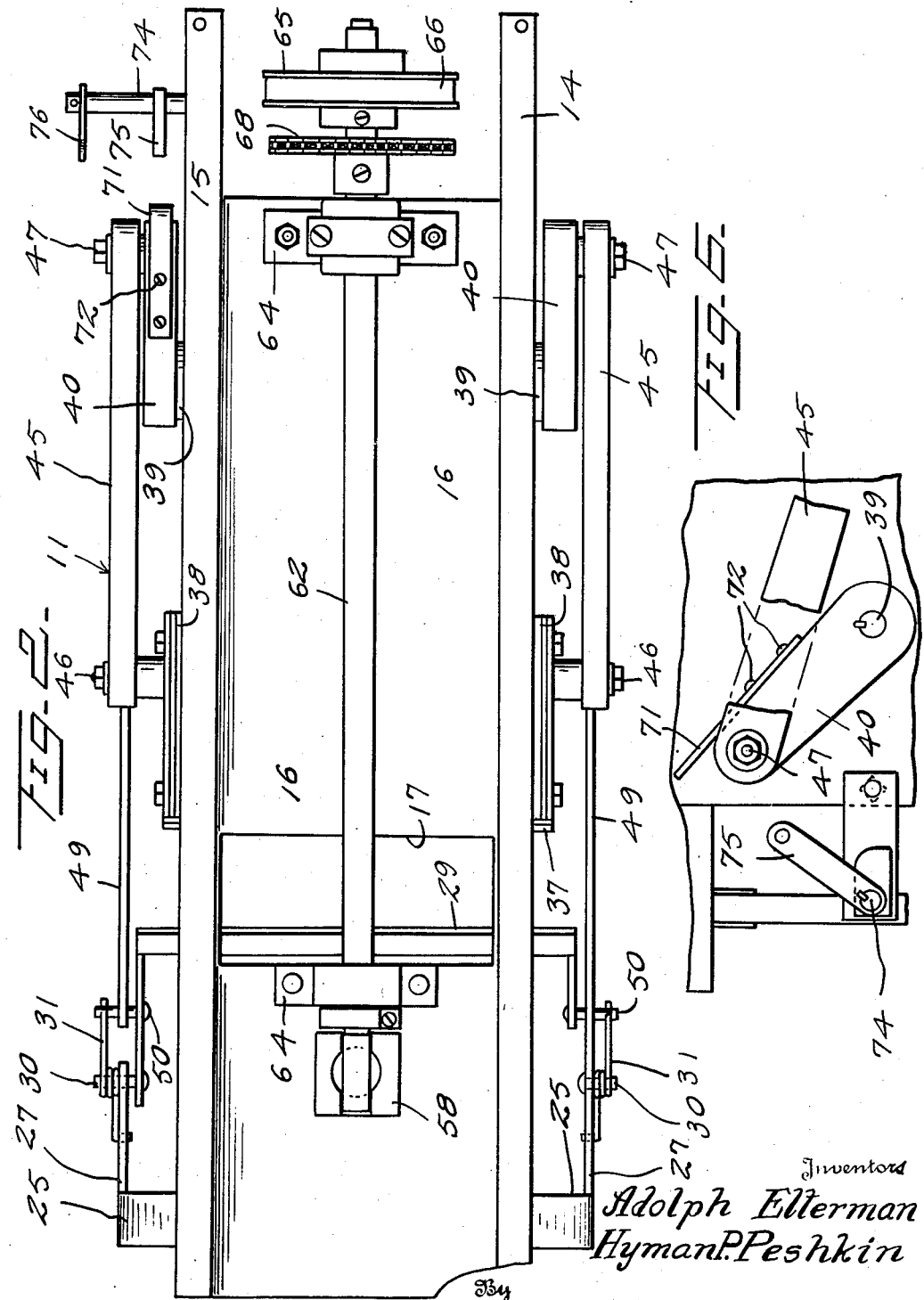

July 10, 1951     A. ELTERMAN ET AL     2,560,096
FRUIT JUICE MACHINE
Filed Sept 17, 1947     4 Sheets-Sheet 3
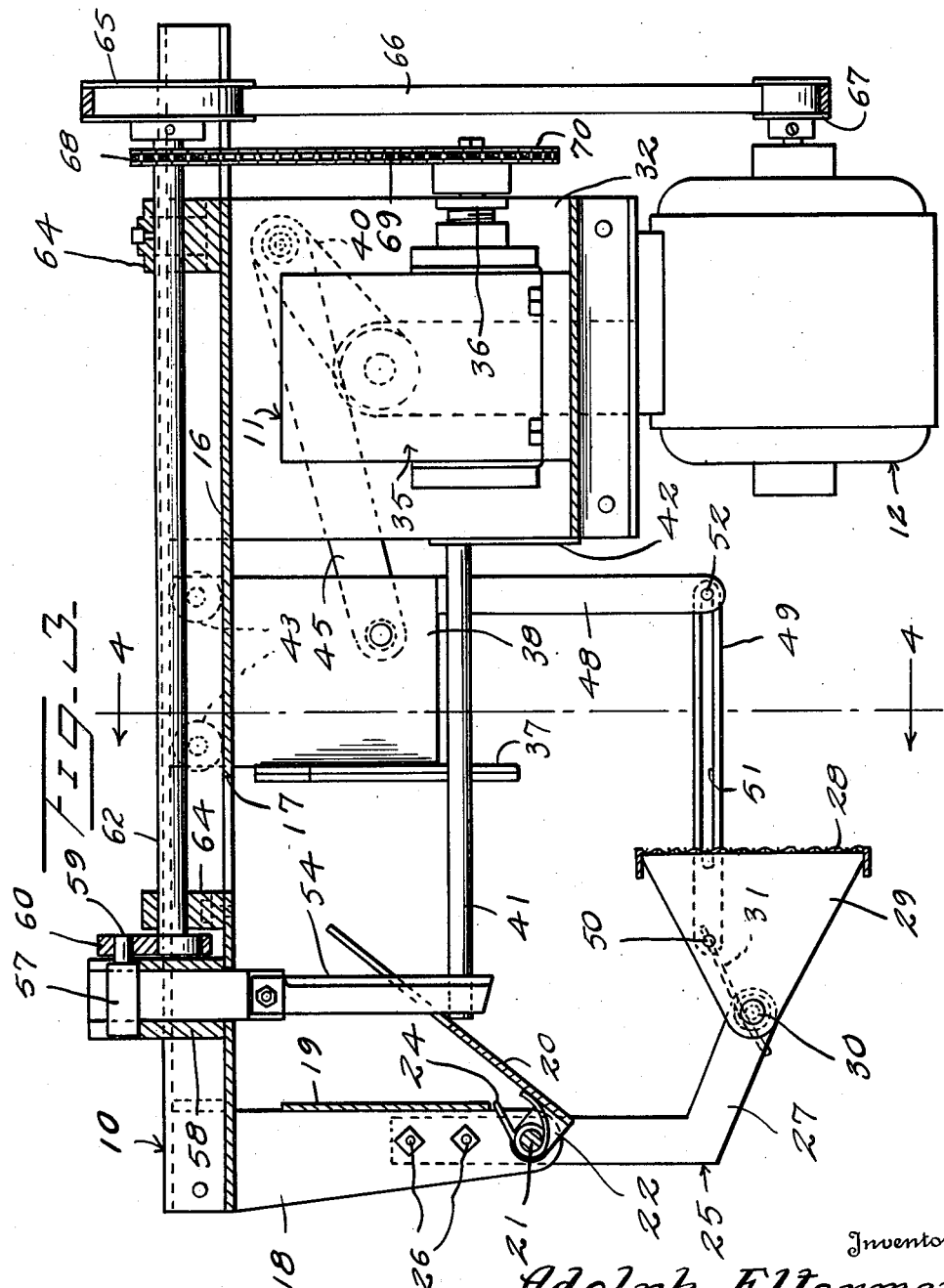
Inventors
Adolph Elterman
Hyman P. Peshkin
By Kimmel & Crowell
Attorneys

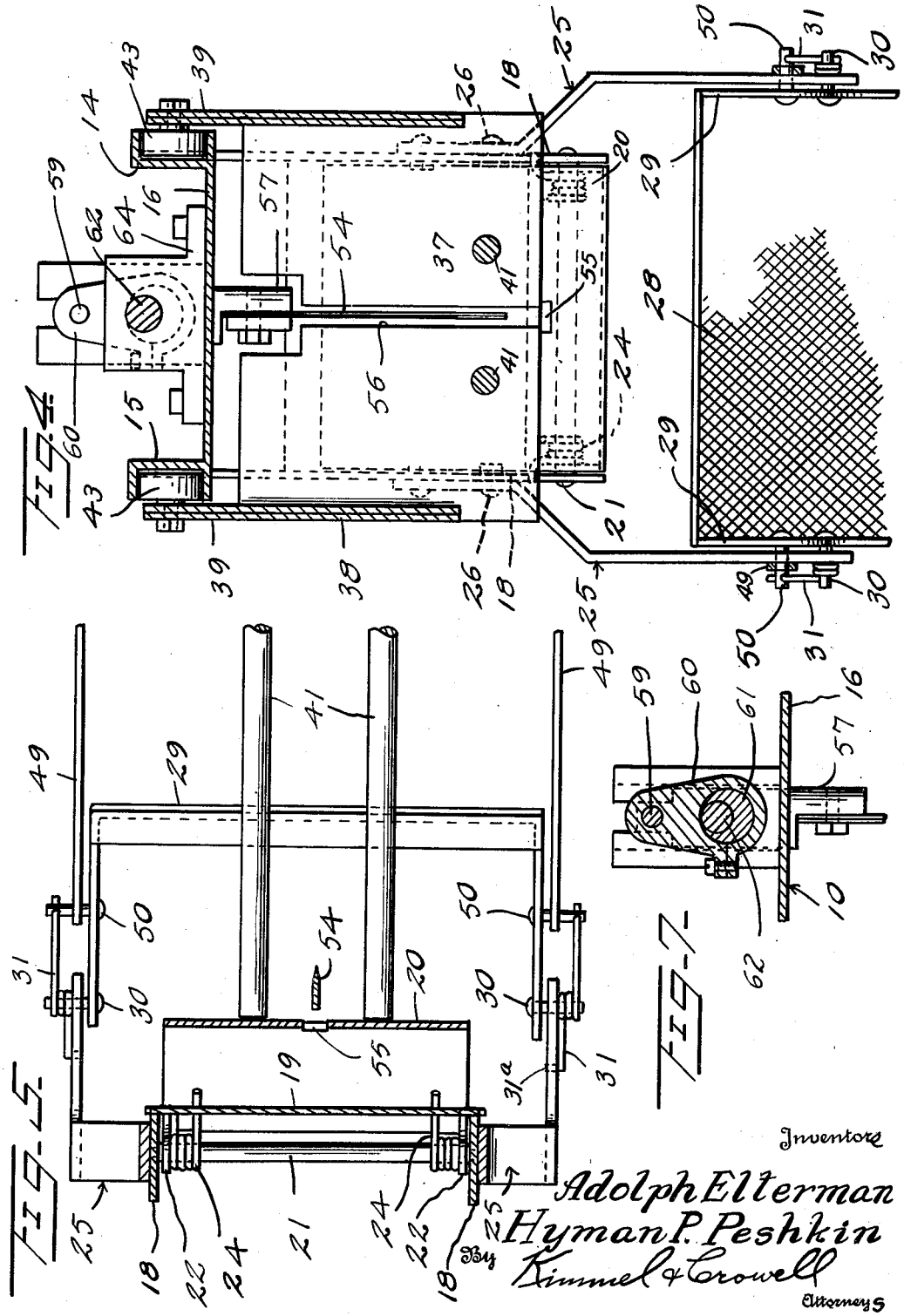

Patented July 10, 1951

2,560,096

UNITED STATES PATENT OFFICE 2,560,096

FRUIT JUICE MACHINE

Adolph Elterman, Belmar, and Hyman P. Peshkin, Asbury Park, N. J.; Jennie Elterman administratrix of said Adolph Elterman, deceased Application September 17, 1947, Serial No. 774,648

3 Claims. (Cl. 100—40)

This invention relates to an improved fruit juice extractor machine.

It is an object of this invention to provide a fruit juicer machine of the kind to be more particularly described hereinafter which is so constructed and arranged as to be adapted to dispensers for fresh fruit juices which may be hand operated or coin controlled devices.

Another object of this invention is to provide an improved juice extractor of this kind, having a motor driven pressure plate and a reciprocating cutter or knife for cutting the orange or lemon in two immediately prior to crushing the orange for extracting the juice. The knife is provided for constant reciprocating motion during the operation of the motor and the pressure plate reciprocates in the machine, making a complete cycle of operation for each individual fruit from which the juice is to be extracted.

Another object of this invention is to provide a fruit juice machine of this type having a strainer below the pressure plates for separating the pulp and seeds from the juice, the strainer being so constructed and arranged that when the fruit has been compressed the full limit of the stroke of the moving pressure plate and the plate starts its return motion, the remaining rind will fall upon the strainer and as the pressure plate nears the limit of its return movement, the strainer will be rocked for spilling the rind, pulp and seeds from the machine into a suitable receptacle.

A further object of this invention is to provide a machine of this kind which is very compact, thus adapting itself to any type of dispenser for extracting the juice from a single orange or other similar fruit, irregardless of the capacity of the entire unit. The size of this unit and compactness of the arrangement of the constituent elements render the machine economical to manufacture and assemble, while providing at the same time that high degree of efficiency required for commercial units of this kind.

With the above and other objects in view, my invention consists in the arrangement, combination and details of construction disclosed in the drawings and specification, and then more particularly pointed out in the appended claims.

In the drawings:

Figure 1 is a side elevation of the fruit juice extracting machine constructed according to an embodiment of this invention, Figure 2 is a top plan view, Figure 3 is a longitudinal section through the machine, Figure 4 is a transverse section taken on the line 4—4 of Figure 3, Figure 5 is a fragmentary horizontal section taken on the line 5—5 of Figure 1, Figure 6 is a fragmentary detail side elevation, partly broken away, of the trip lever, Figure 7 is a fragmentary detail section of the knife operating cam.

Referring to the drawings, the numeral 10 designates generally the supporting frame for a fruit juice extracting machine of this kind. This machine is particularly adapted for use in vending machines for dispensing fresh fruit juices from a coin operated machine.

The fruit juice extracting machine 11, supported from the frame 10, is operated or driven by a motor 12, which in turn may be actuated or started by a coin selecting mechanism. The fruit juice extracting machine 11 may be connected for pressing a certain number of oranges or lemons in one operation, or may be used for pressing the fruit until a certain selected amount of juice has been extracted.

Any suitable timing mechanism may be used in connection with the motor 12, correlating the operation of the machine 11, either to the amount of fruit or the amount of juice extracted. The fruit juice extracting machine 11 is of an open type, which may be used in glass enclosed dispensers, whereby the operator may see the fruit squeezed after his selection has been made, and the machine started in its operation.

The frame 10, formed of a pair of upper elongated frame members 14 and 15, spaced apart by a plate 16, is adapted to be secured into the cabinet of a suitable dispensing device by means of bolts or other suitable fastenings extending through the opposite ends of the frame members 14 and 15. A hopper, not shown in the drawings, is to be provided for supporting a large amount of fruit in the machine, and each article to be squeezed will be dropped into the machine 11 after an article has been squeezed immediately preceding. The hopper and frame 10 will be so associated that a single object will be admitted to the presser plates in each cycle of the operation of the machine 11.

The plate 16 is formed with an opening 17 near one end thereof, through which the fruit may be dropped as it leaves the hopper. At one end of the frame 10 there are provided a pair of downwardly extending arms or members 18. The members 18 are fixed at their upper ends to the horizontal members 14 and 15, and a fixed plate 19 is fixed between the supporting arms 18 below the frame members 14 and 15.

A hinged pressure plate 20 is pivotally connected to the lower end of the arms 18 by a hinge pine 21, engaging through the ears 22 at the lower end of the pressure plate 20.

A coil spring 24 is coiled about the pin 21 and engages at one end the supporting arm 18, and the rear surface of the pressure plate 20 at the other end. The pressure plate 20 is hingedly connected below the fixed plate 19, and is constantly urged to the extended position, as shown in Figure 3, by the spring 24.

Two L-shaped supporting arms 25 are fixed to and extend below the arms 18. The supporting arms 25 may be fixed to the arms 18 by bolts 26 or other suitable fastening devices. The lower arm 27 of the support 25 extends forwardly of the support 18. A screen 28 is pivotally supported from the free end of the arms 27 below the pressure plate 20 and fixed plate 19.

The screen 28 is fixed on a frame 29 which is pivotally connected to the end of the arm 27. A pin 30 extends through the arm 27 and the frame 29, and a spring 31 is secured about the pin 30 and has one end 31a hooked under the arm 27, as shown in Figure 5. This spring 31 urges the frame 29 and screen 28 to an erect position whereby the screen 28 is disposed below the pressure plate 20 and fixed plate 19.

The motor 12 is suspended below the frame 10 by a U-shaped supporting strap 32. The upper ends of the strap 32 are fixed to the sides of the frame members 14 and 15 by rivets 34, or other suitable fastening devices. The strap 32 is disposed at the end of the frame 10 opposite from the supporting arms 18.

A gear box 35 is supported within the U-shaped frame 32 above the motor 12, and is operatively connected thereto. The gear box 35 will rotatably support therein a screw or worm as 36, and a gear wheel engaging therewith constituting a conventional worm and gear wheel gearing. The hub or shaft 39 of the gear wheel, driven by the worm 36, extends through the gear box 35 at right angles to the worm 36, and a crank 40 is fixed to and rotated by the shaft.

The sliding pressure plate 37 is disposed below the frame members 14 and 15 for cooperation with the hinged pressure plate 20 for squeezing the fruit in the machine. The pressure plate 37 is fixed to or formed on the rear end of a carriage 38 which is slidably mounted on the frame members 14 and 15.

The frame members 14 and 15 are U-shaped or channel-shaped, as shown in Figure 4, and rollers 43 rotatably carried by the upper end of the carriage 38 engage in the channel of the frame members 14 and 15 upwardly from the pressure plate 37, for attaching the rollers 43. The carriage 38 and the pressure plate 37 are thus slidably mounted on the frame 10 for sliding movement longitudinally thereof.

A pair of parallel horizontally disposed rods 41 are fixed to the forward end of the strap 32 by a front plate 42 and extend substantially up to the fixed plate 19. The rails or rods 41 form a guide track below the frame 10 on which the objects of fruit will be deposited from the hopper before and during the extracting process.

The pressure plate 37 is formed with openings 44 through which the rods 41 extend so that the rods 41 will also form a guide or track for the pressure plate 37 and the carriage 38. A link 45 is pivotally connected to the carriage 38 by a bolt or pin 46 at one end, and to the free end of the crank 40 by a pin 47. Rotation of the gear within the housing 35 will cause rotation of the crank 40, effecting reciprocating motion of the carriage 38 and the pressure plate 37 along the guide 41 and any orange or other fruit on the guide 41 will be pressed between the pressure plates 37 and 20 when the pressure plate 37 and carriage 38 reach the limit of the stroke of the crank 40.

The object of fruit between the pressure plates 37 and 20 will, as the pressure plates 37 move rearwardly, force the pivoted plate 20 to an erect position overlying the fixed plate 19. It is at this point that the fruit will be completely mashed and the pressure plate 37 will start the return stroke.

When the pressure plate 37 is in this rearmost position, the screen 28 will be in an erect position, shown in dotted lines in Figure 1. The juice and pulp from the fruit will then fall onto the screen 28 which will permit only the juice to pass therethrough. A juice receiving container, not shown, would be positioned immediately below the screen in the erect position thereof, and a refuse receiving container, not shown, would be positioned under the screen in the rocked position thereof, shown in full lines in Figure 1, to receive the pulp.

In the return stroke of the carriage 38, the screen 28 will be rocked for removing the pulp and other debris from the machine. An arm 48 extends downwardly from the carriage 38 and a link 49 connects the lower end of the arm 48 to the frame 29. The link 49 is pivotally connected to the side members of the frame 29 by a pin 50, The arm 49 is formed with an elongated slot 51 therein at its other end, and a pin 52 carried by the arm 48 engages in the slot 51 for the lost motion connection between the carriage and sliding pressure plate to the screen supporting frame. As the carriage 38 moves rearwardly, the spring 31 will urge the frame 29 to its erect position during the first motion of the carriage. Further rearward motion of the carriage 38 will be effected free from motion of the frame 29 as the pin 52 will be free to slide in the slot 51. The frame 29 will remain in this erect position during the forward motion of the carriage 38 until the pin 52 has reached the forward limit of the slot 51, at which time the frame 29 will again be rocked or tilted for discharging the pulp or rind from the machine.

A knife 54 is provided intermediate the length of the frame for slicing the fruit as it is expressed along the guide 41. The knife 54 is disposed between the pressure plate 20 and pressure plate 37 when the plate 37 is in its forward position. The knife is disposed forwardly of the fixed plate 19 a sufficient distance so that the fruit will be completely severed before it is pressed against the plate 20. As the knife 54 is disposed between the rods 41 and pivoted pressure plate 20, the pressure plate is formed with a slot 55 therein so that a part of the pressure plate 20 will extend forwardly of the knife 54 in the normal position.

The sliding pressure plate 37 is also formed with a slot 56 therein so that the plate 37 may pass on both sides of the knife during its sliding movement. The knife 54 is reciprocated vertically for cleanly cutting the fruit.

A knife support 57 is slidably carried by a sleeve 58 fixed on the upper side of the plate 16 on the frame 10. A forwardly extending pin 59 is carried by the upper end of the support 57 and engages through the link 60. The lower end of the link 60 is engaged by a cam 61 fixed on the rear end of the drive shaft 62. The drive shaft 62 is journaled above the plate 16 by bearings 64 near opposite ends of the plate 16 between the frame members 14 and 15.

A pulley 65 is fixed on the forward end of the shaft 62 and is driven by a belt 66 which also engages about the pulley 67 fixed on the drive shaft of the motor 12. A sprocket 68 is fixed on the shaft 62 rearwardly of the pulley 65 and a chain 69 engages about the sprocket 68 and about the sprocket 70 for driving the gear box 35.

The sprocket 70 is fixed on the forward end of the screw 36 for rotating the screw, and the carriage 38 from the motor 12. The shaft 39 of the gear in the gear box 35 extends through both sides of the U-shaped support 32 and cranks 40 are disposed on both sides of the machine 11. The driving links 45 are also connected on both sides of the machine to the carriage 38.

A flat bar or trip 71 is fixed onto one of the cranks 40 by bolts 72 or other suitable securing means and provides an extension thereof. An auxiliary shaft 74 is rotatably carried by one frame member as 15, and extends at right angles thereto. The shaft 74 extends parallel to the shaft 39 and pin 47. An arm 75 is fixed on the shaft 74 and is adapted to be intermittently engaged by the trip 71 during each cycle of the crank 40. The trip 71 is adapted to press the arm 75 downwardly as the crank 40 reaches the forward limit of its rotation, and a second arm as 76, is fixed on the shaft 74 and will also be rocked as the shaft 74 is rotated by the engagement of the trip 71 with the arm 75.

The arm 76 is adapted to be connected to a link or other mechansm associated with the hopper, not shown, for permitting the admission of another object from the hopper to the machine 11 as the carriage 38 reaches the forward limit of its sliding motion.

In the use and operation of this fruit juice extracting machine, the operation of the motor 12 will effect the continual reciprocation of the knife 54. As the shaft 62 is rotated by the motor 12, the screw 36 will be rotated by the chain 69 engaging the sprocket 70. Rotation of the screw 36 will in turn effect rotation of the crank 40. As the crank 40 is rotated the carriage 38 will be reciprocated horizontally along the guide rods 41. The fruit within the machine will then be expressed along the rods 41 past the knife 54 and crushed between the plates 37 and 20. As the carriage 38 moves in the second half of its cycle forwardly, the spring 24 will urge the plate 20 to its tilted position for dislodging the rind which may adhere to the plates 19 and 20 due to the pressure from the plate 37.

As the carriage 38 reaches the forward limit of its travel, the spring 28 will be rocked through the lost motion connection between the carriage 38 and the frame 29 for discharging the rind and other debris from the screen 28.

We do not mean to confine ourselves to the exact details of construction herein disclosed, but claim all variations falling within the purview of the appended claims.

What we claim is:

1. A fruit juice extracting machine comprising a supporting frame, a fruit supporting guide on said frame, a spring pressed first pressure plate rockably mounted on said frame, a second pressure plate cooperating with said first pressure plate for crushing a fruit therebetween and slidable along said guide, means operatively connected to said second pressure plate for effecting reciprocation of said latter pressure plate along said guide, a spring pressed strainer support pivotally mounted on said frame below said first pressure plate, and a lost motion link connection between said strainer support and said reciprocable pressure plate for rocking said strainer support as said latter pressure plate approaches one end of its reciprocating cycle.

2. A fruit juice extracting machine comprising a supporting frame, a fruit supporting guide on said frame, a spring pressed first pressure plate pivotally mounted on said frame, a second pressure plate cooperating with said first pressure plate for crushing a fruit therebetween, a carriage slidably mounted on said guide, said second pressure plate being fixed on said carriage, a crankshaft, means rotating said crankshaft, a pitman connected between said crankshaft and said carriage for effecting reciprocation of said carriage along said guide, a spring pressed strainer support pivotally mounted below said first pressure plate, and a slotted link connecting said strainer support and said carriage and providing a lost motion connection therebetween for rocking said support at certain portions of the reciprocation of said carriage.

3. A fruit juice extracting machine comprising a supporting frame, a fruit supporting guide on said frame, a spring pressed first pressure plate rockably mounted on said frame, a second pressure plate cooperating with said first pressure plate for crushing a fruit therebetween and slidable along said guide, means operatively connected to said second pressure plate for effecting reciprocation of said latter pressure plate along said guide, said second pressure plate being adapted to push a fruit therebefore during a portion of the reciprocation thereof, a spring pressed strainer support pivotally mounted on said frame below said first pressure plate, a lost motion link connection between said strainer support and said reciprocable pressure plate for rocking said strainer support as said latter pressure plate approaches one end of its reciprocating cycle, a vertically disposed cutting blade slidably depending from said frame between said first and second pressure plates, and means for vertically reciprocating said blade, said first and second pressure plates being formed with vertical slots therein adapted to receive said blade whereby a fruit will be sliced by said blade prior to being crushed.

ADOLPH ELTERMAN.
HYMAN P. PESHKIN.

REFERENCES CITED

The following references are of record in the file of this patent:

UNITED STATES PATENTS

| Number | Name | Date |
|---|---|---|
| 808,861 | Mosteller | Jan. 2, 1906 |
| 1,152,933 | Cooper | Sept. 7, 1915 |
| 1,180,959 | Turner | Apr. 25, 1916 |
| 1,345,963 | Santos | July 6, 1920 |
| 1,620,551 | Hughes | Mar. 8, 1927 |
| 1,938,463 | Roberts | Dec. 5, 1933 |
| 2,067,555 | Walker | Jan. 12, 1937 |
| 2,265,409 | Verbrugge | Dec. 9, 1941 |
| 2,454,256 | Myers | Nov. 16, 1948 |